April 21, 1942. T. DE ROODE 2,280,065
VEHICLE
Filed April 10, 1937 16 Sheets-Sheet 1
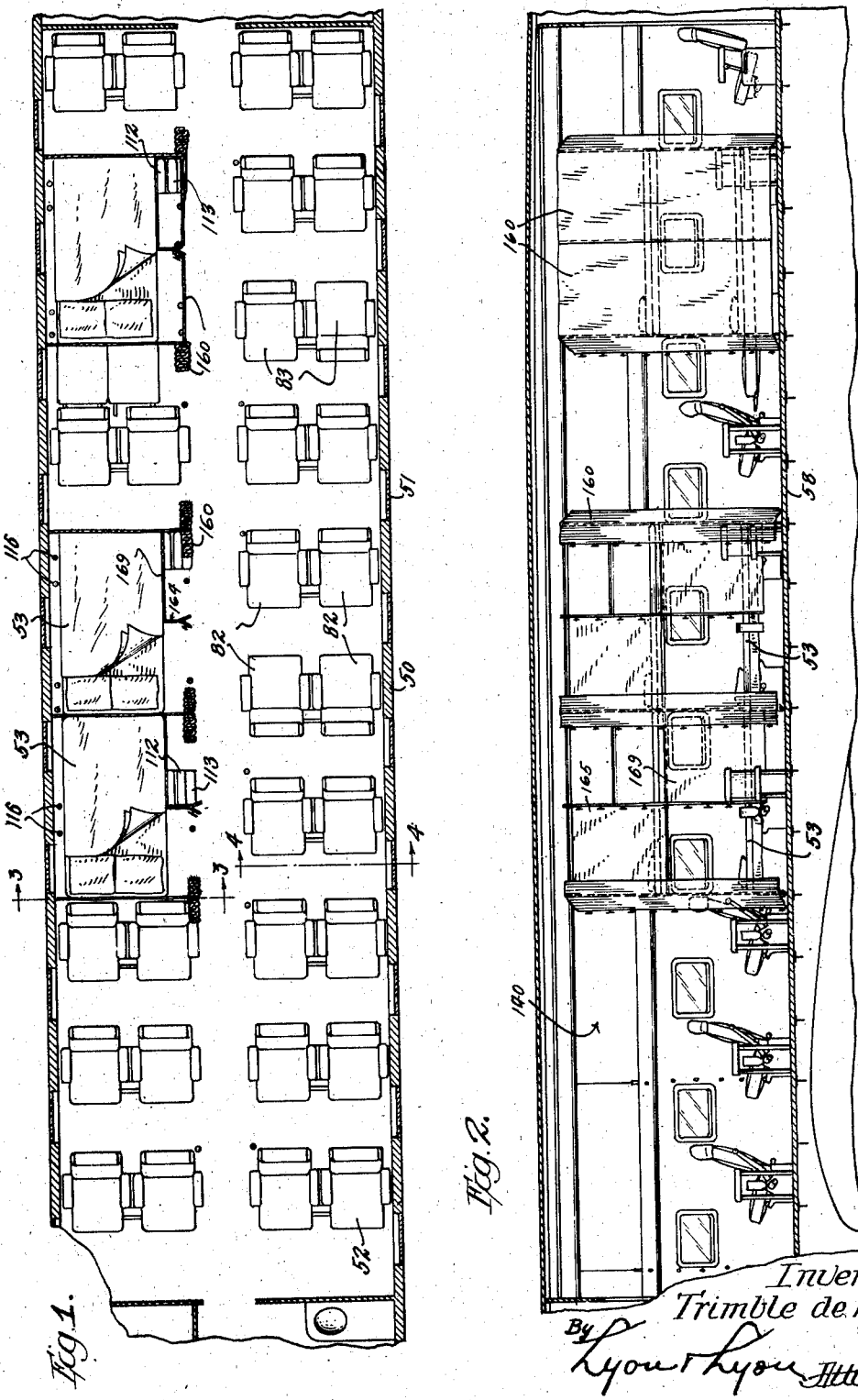
Inventor
Trimble de Roode
By Lyon & Lyon Attorneys

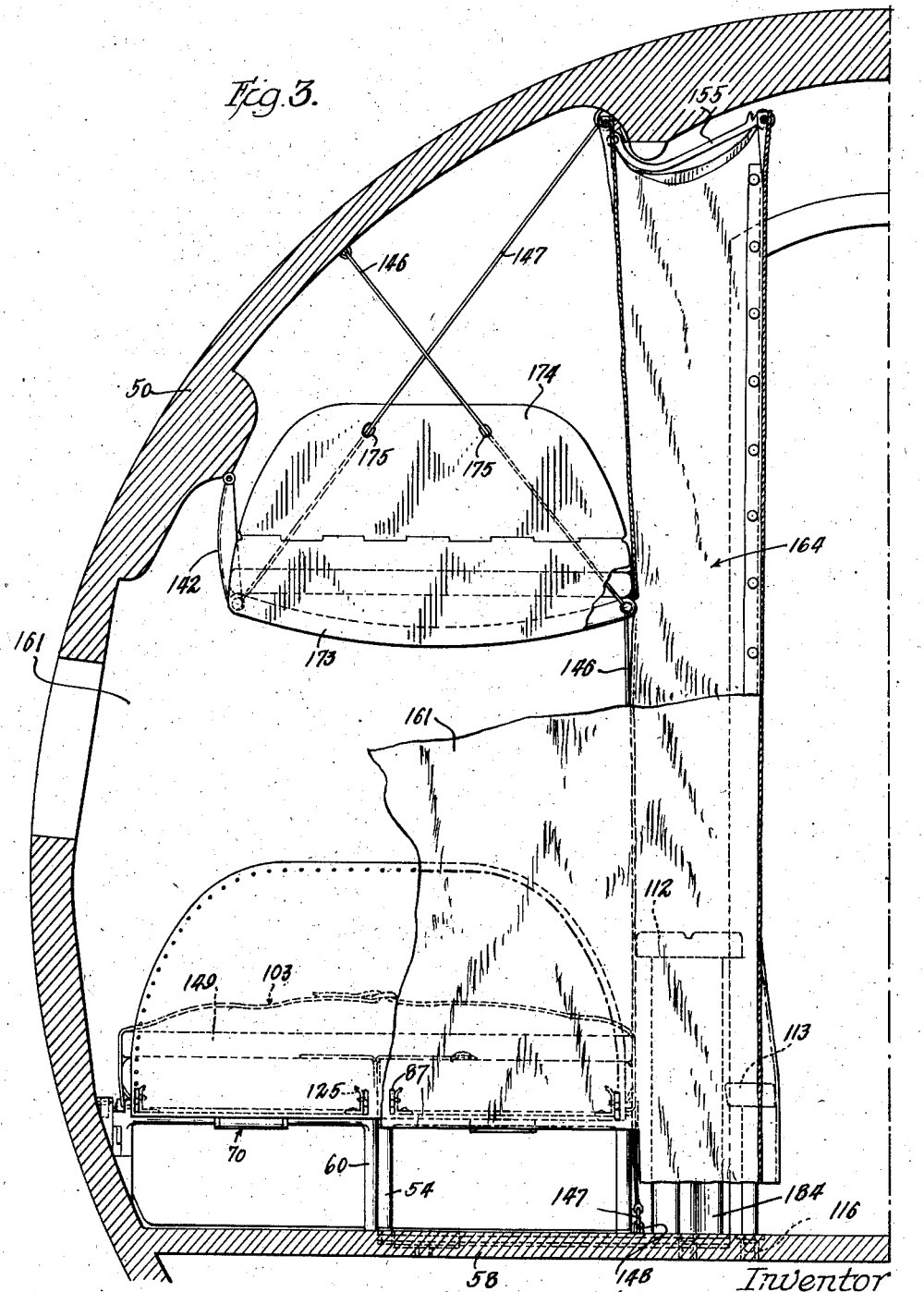

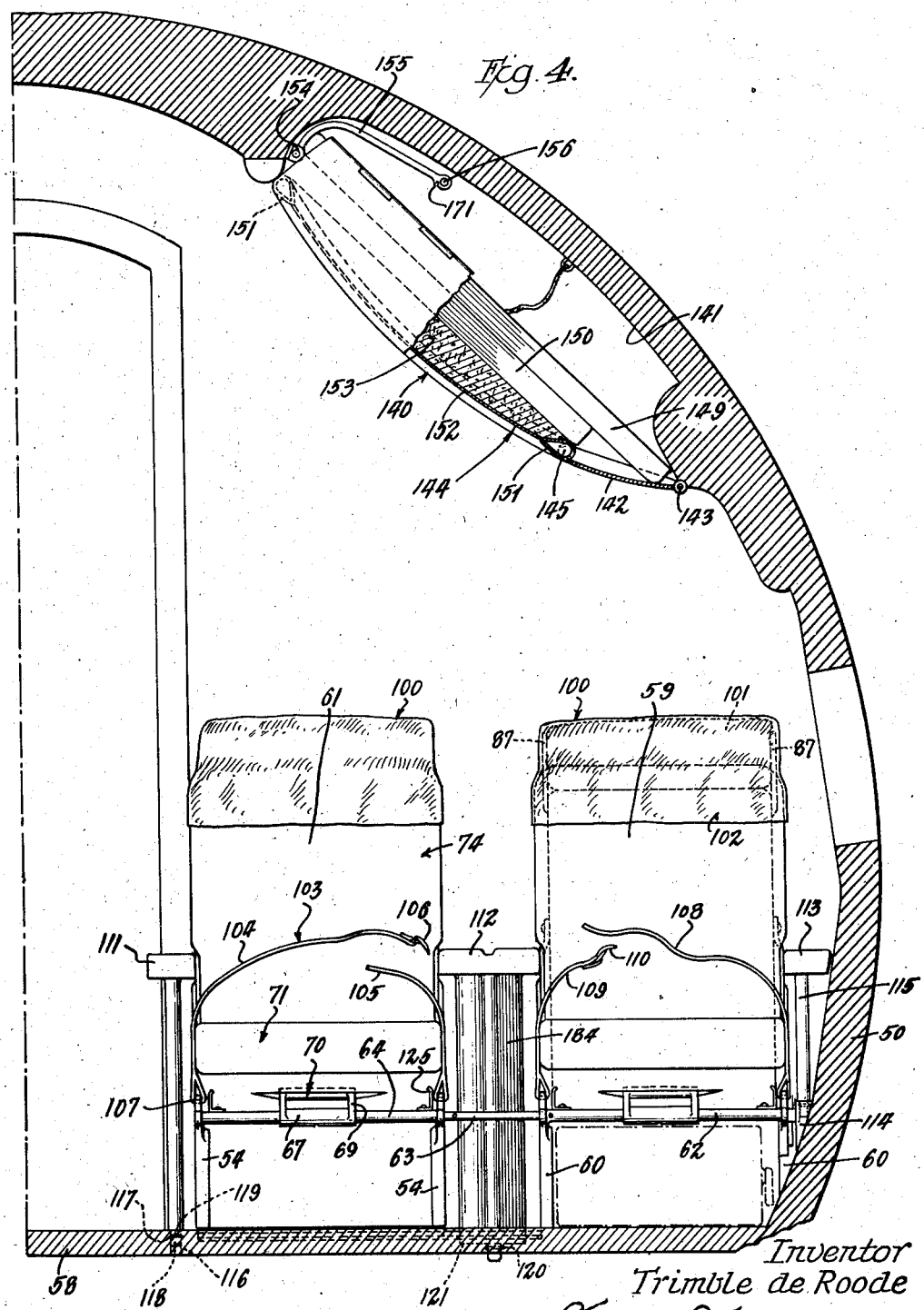

April 21, 1942.　　　T. DE ROODE　　　2,280,065
VEHICLE
Filed April 10, 1937　　16 Sheets-Sheet 4

Inventor
Trimble de Roode
By Lyon & Lyon
Attorneys

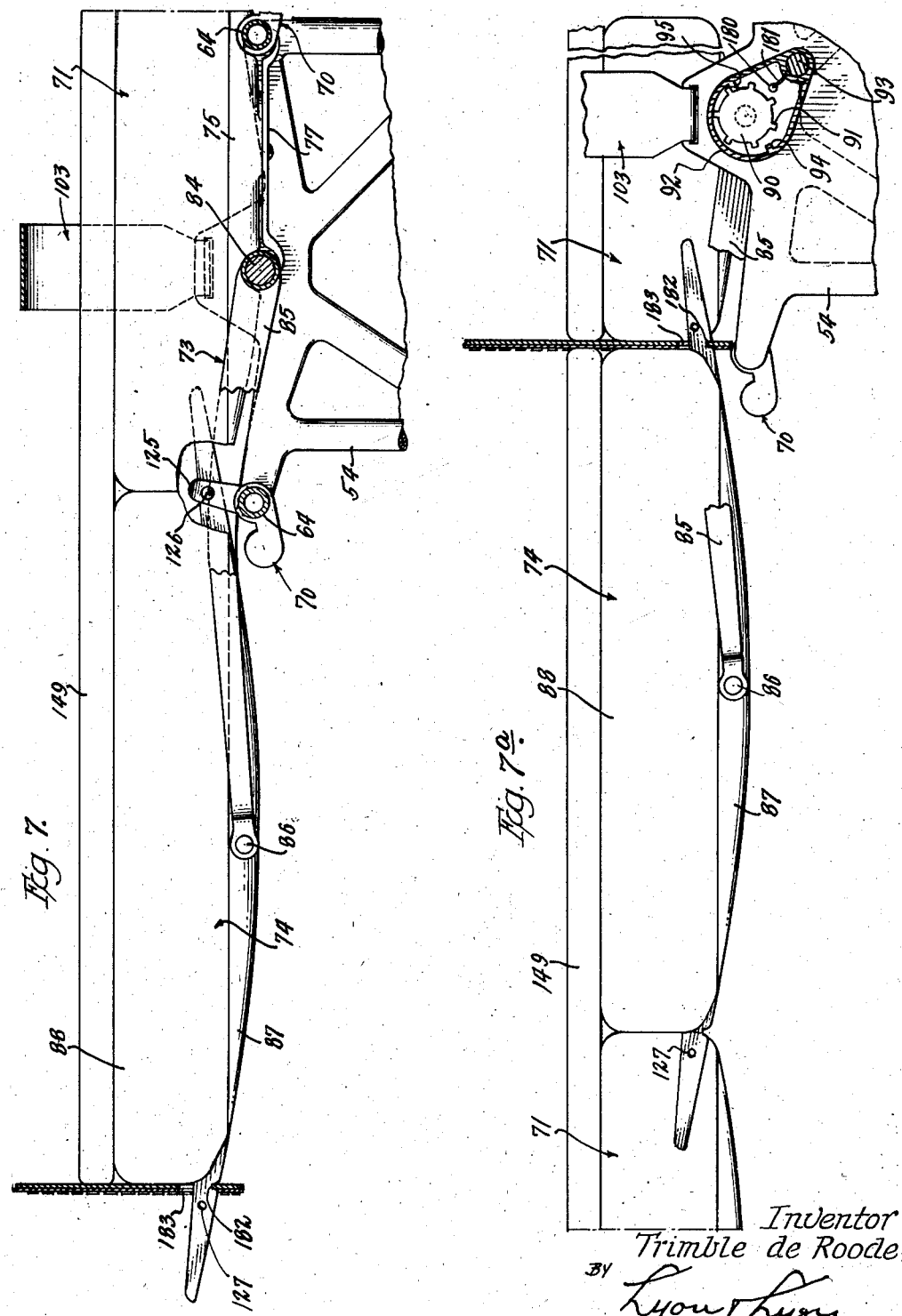

April 21, 1942.   T. DE ROODE   2,280,065
VEHICLE
Filed April 10, 1937   16 Sheets-Sheet 6
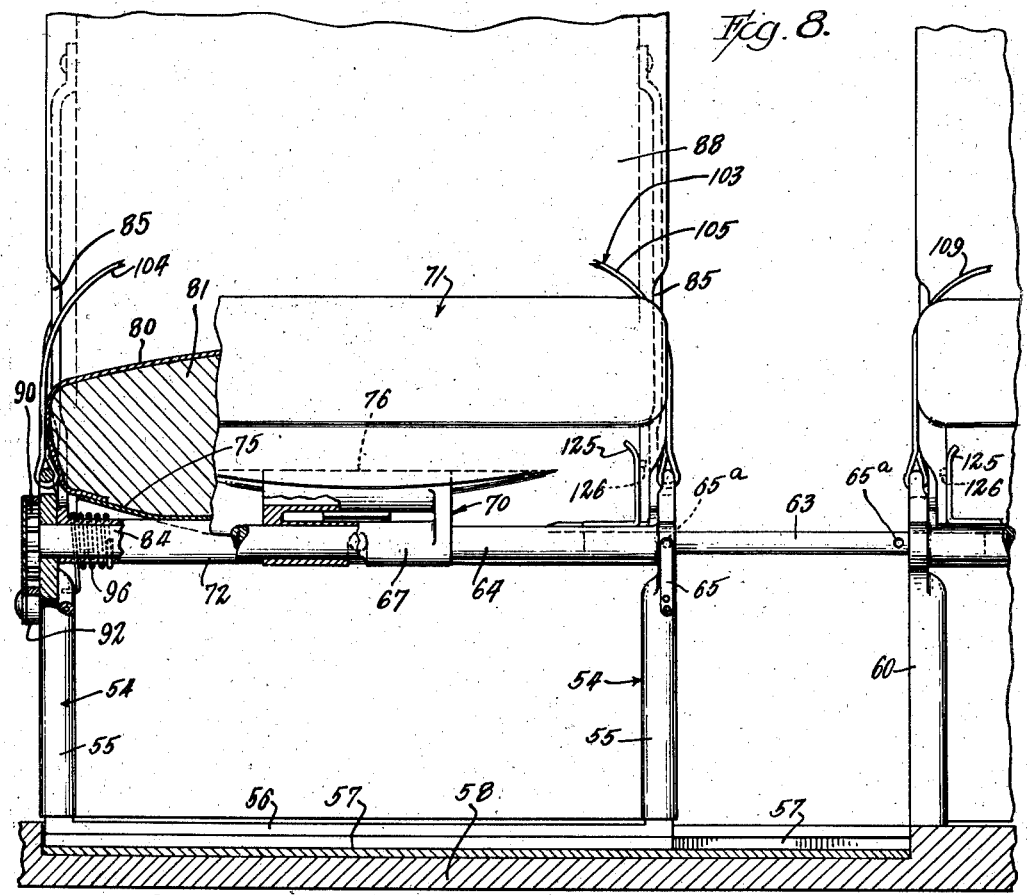
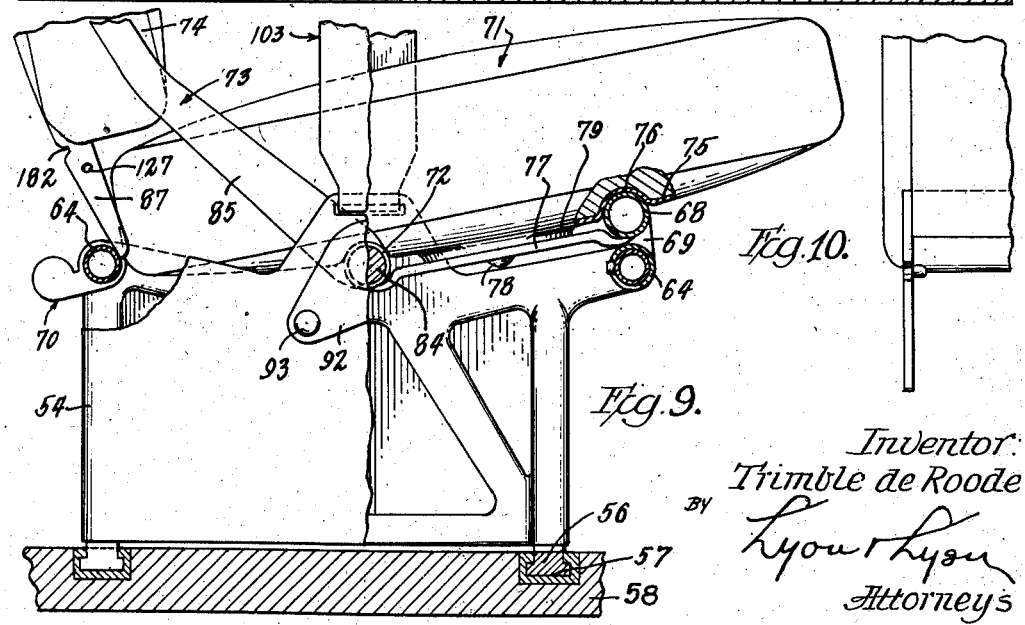
Inventor:
Trimble de Roode
BY
Lyon & Lyon
Attorneys April 21, 1942.                T. DE ROODE                    2,280,065
                                 VEHICLE
                 Filed April 10, 1937        16 Sheets-Sheet 7

Inventor
Trimble de Roode
By Lyon & Lyon
Attorneys

April 21, 1942.                T. DE ROODE                2,280,065
                                 VEHICLE
                          Filed April 10, 1937      16 Sheets-Sheet 8
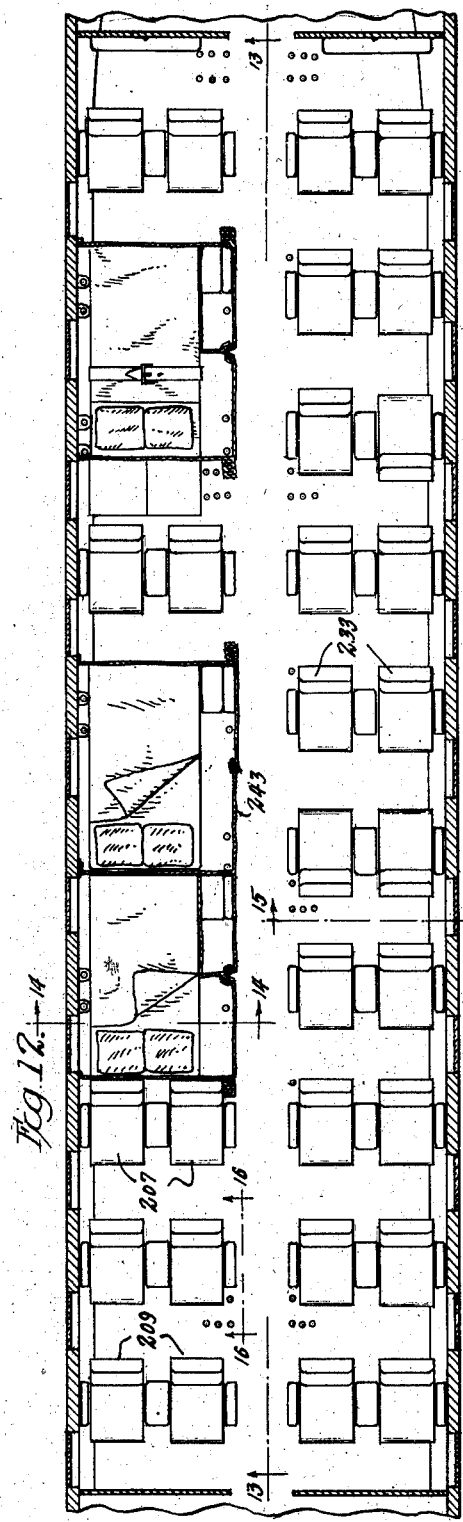
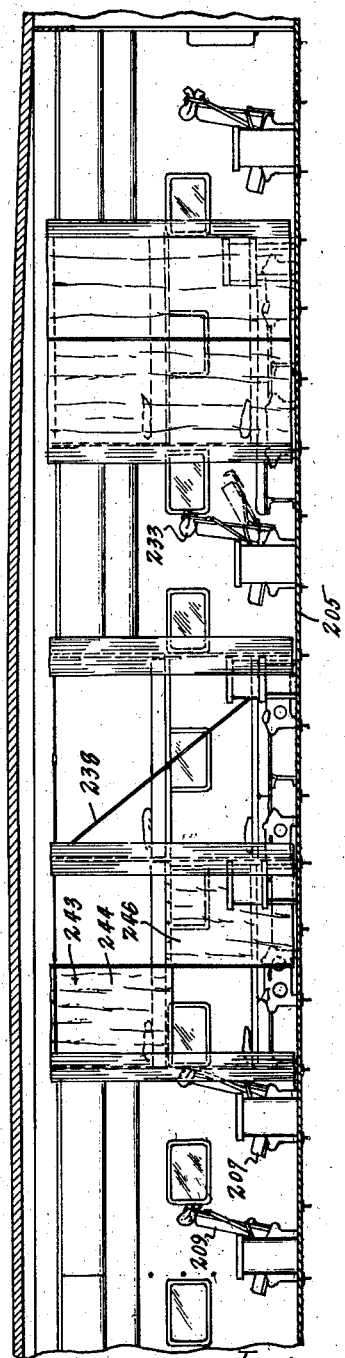
Inventor:
By Trimble de Roode
Lyon & Lyon, Attorneys April 21, 1942.　　T. DE ROODE　　2,280,065
VEHICLE
Filed April 10, 1937　　16 Sheets-Sheet 9

Inventor
Trimble de Roode
By Lyon & Lyon
Attorneys

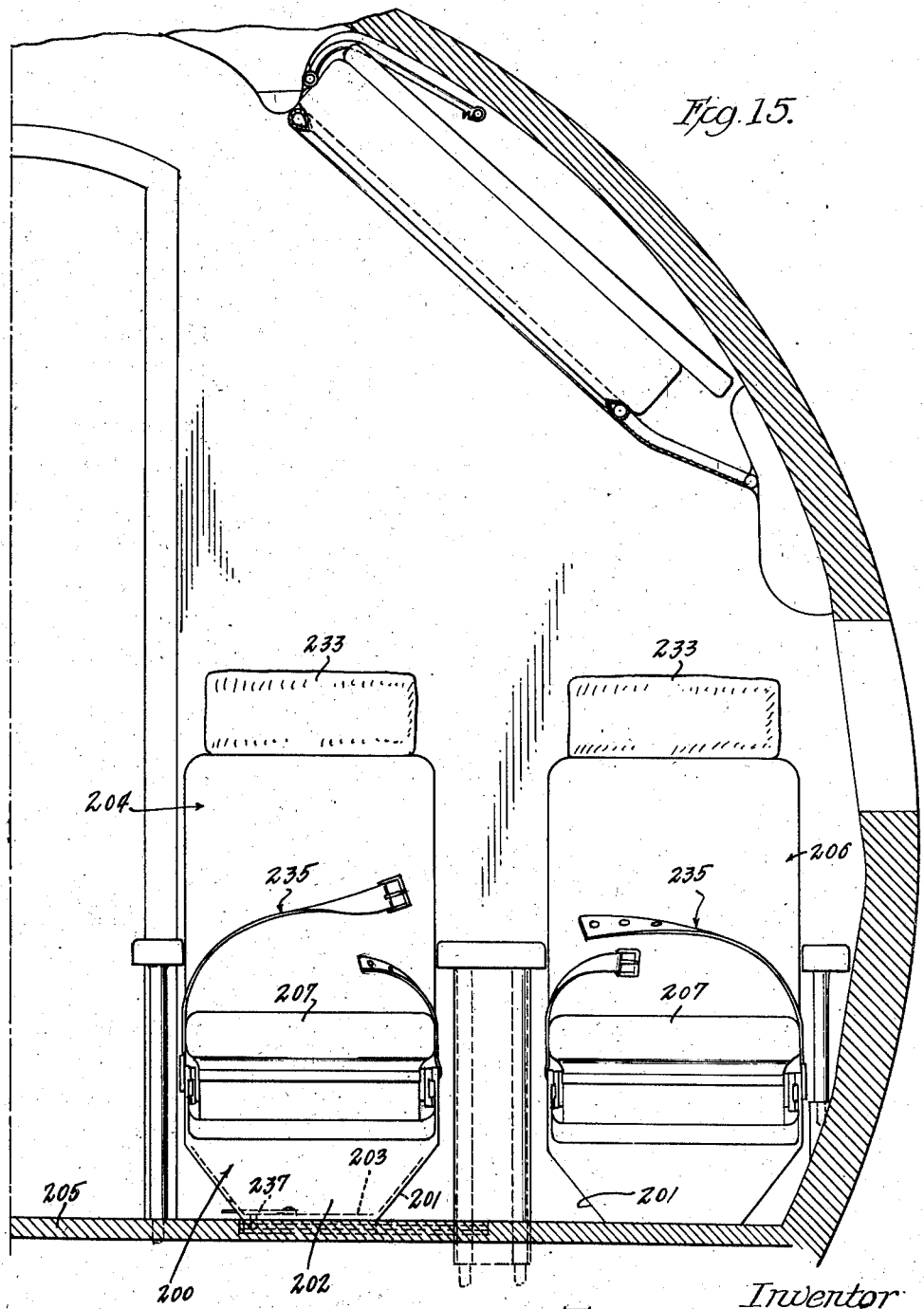

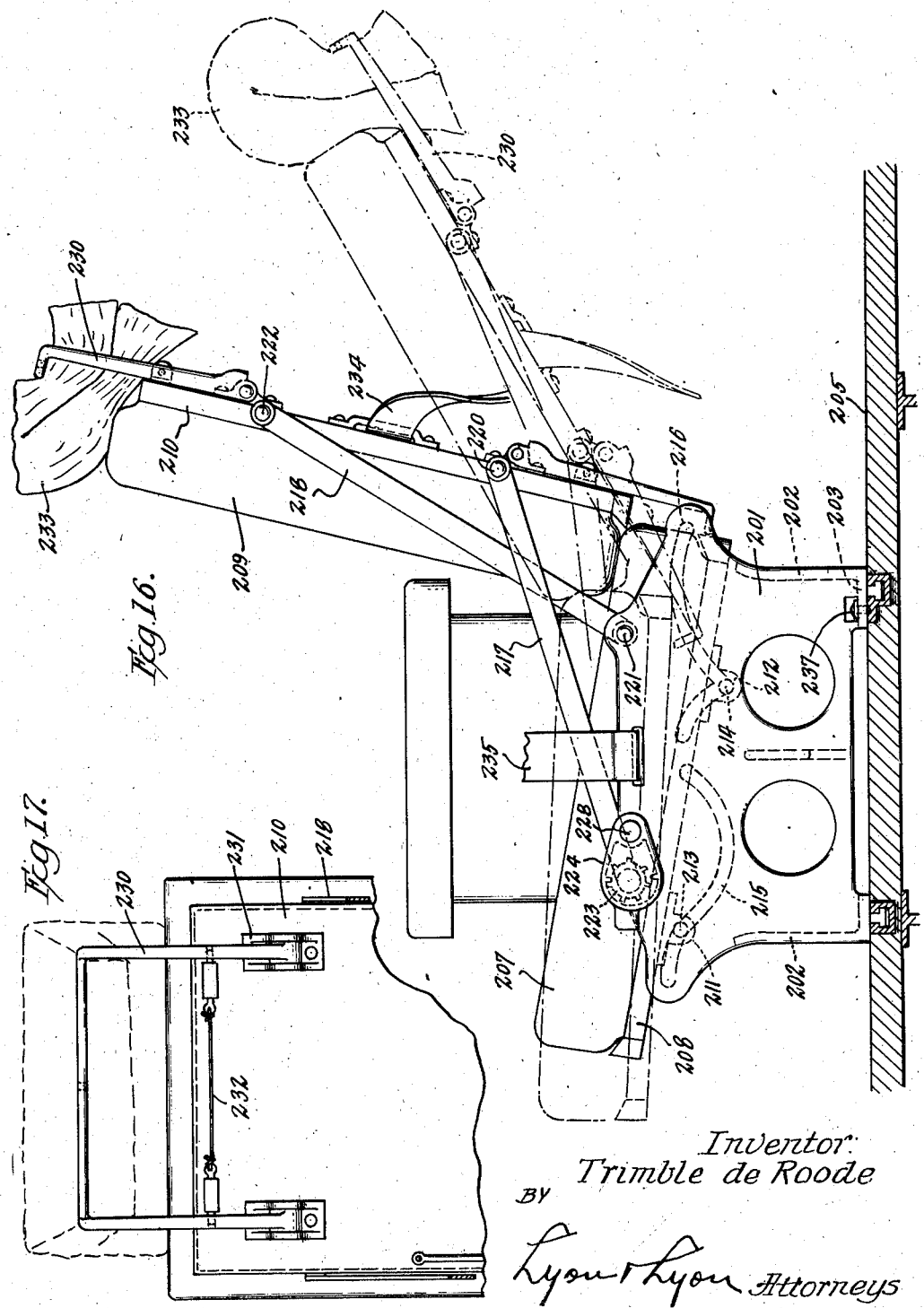

April 21, 1942.　　　T. DE ROODE　　　2,280,065
VEHICLE
Filed April 10, 1937　　16 Sheets-Sheet 12
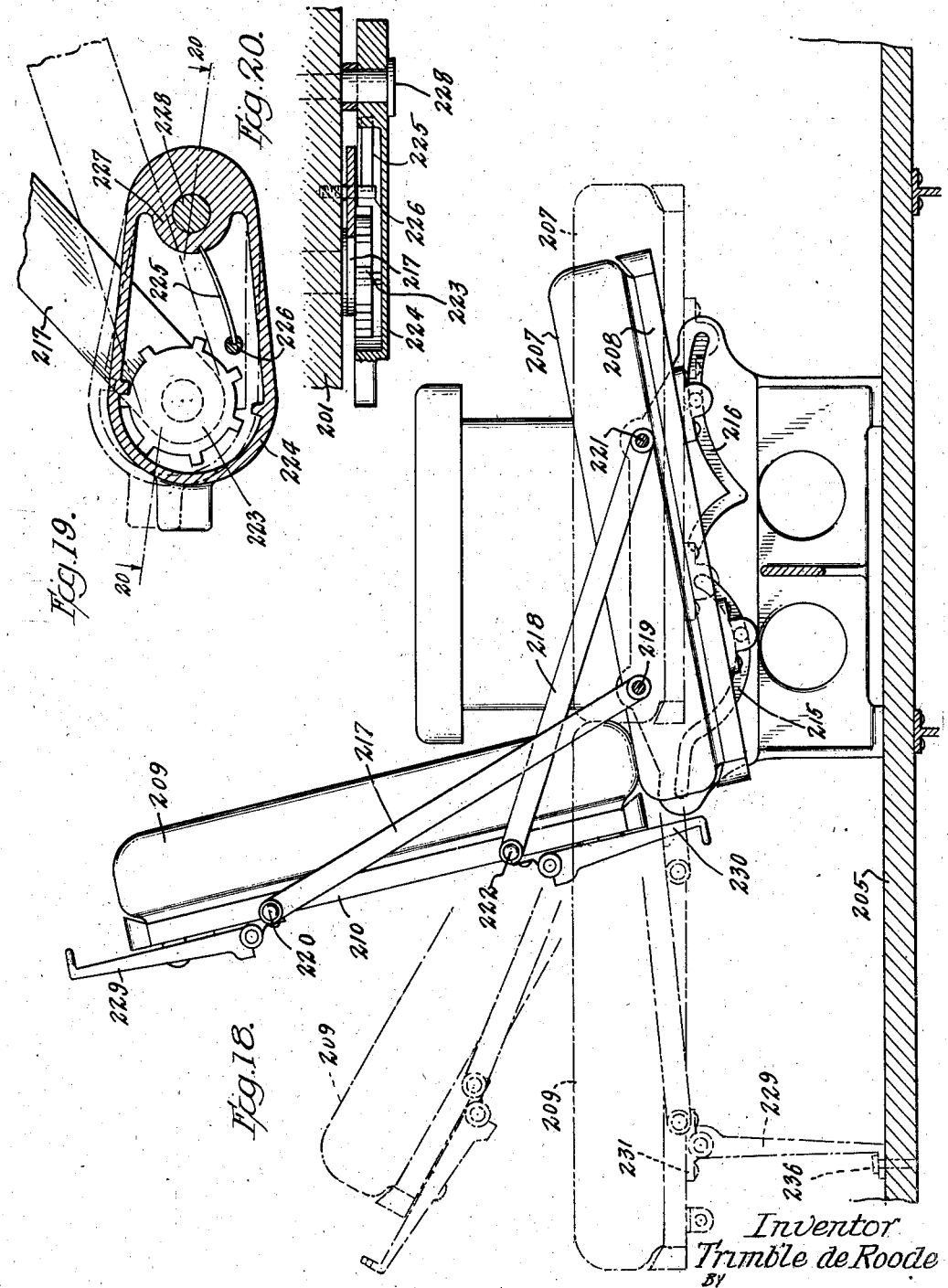
Inventor
Trimble de Roode April 21, 1942.　　　T. DE ROODE　　　2,280,065
VEHICLE
Filed April 10, 1937　　16 Sheets-Sheet 14
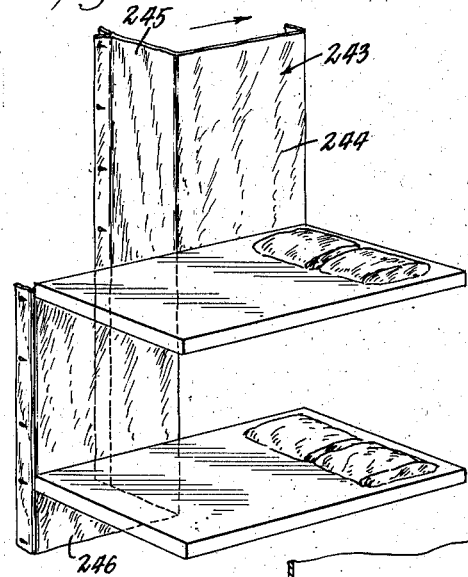
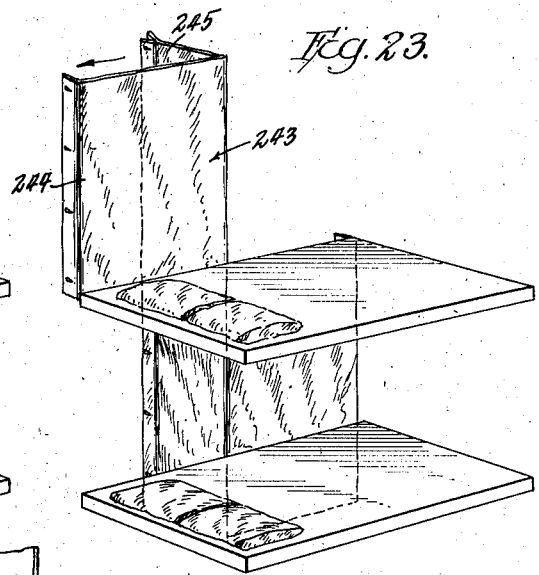
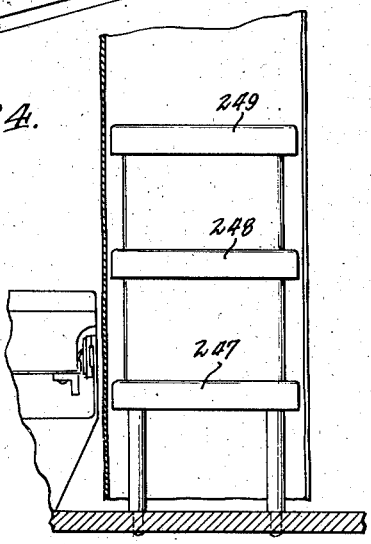
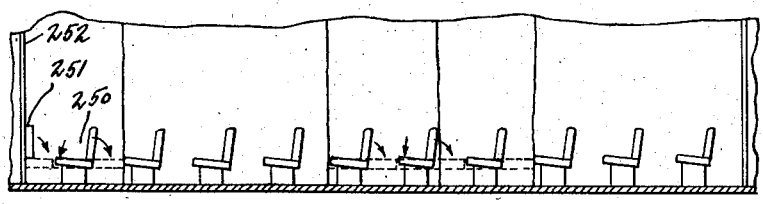
Inventor:
Trimble de Roode
BY
Lyon & Lyon Attorneys April 21, 1942.    T. DE ROODE    2,280,065
VEHICLE
Filed April 10, 1937    16 Sheets-Sheet 15

Inventor
Trimble de Roode
BY
Lyon & Lyon
Attorneys

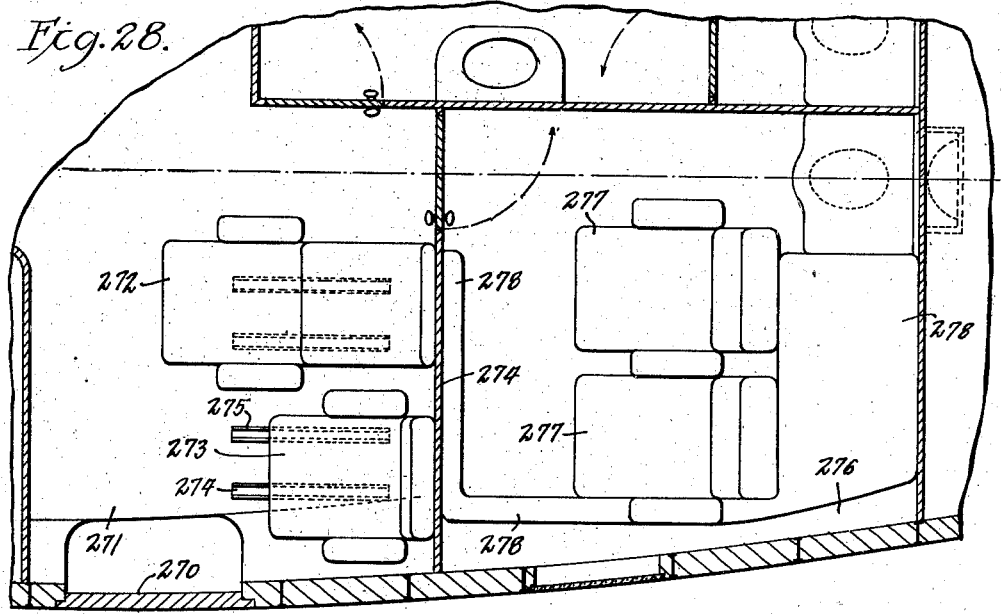
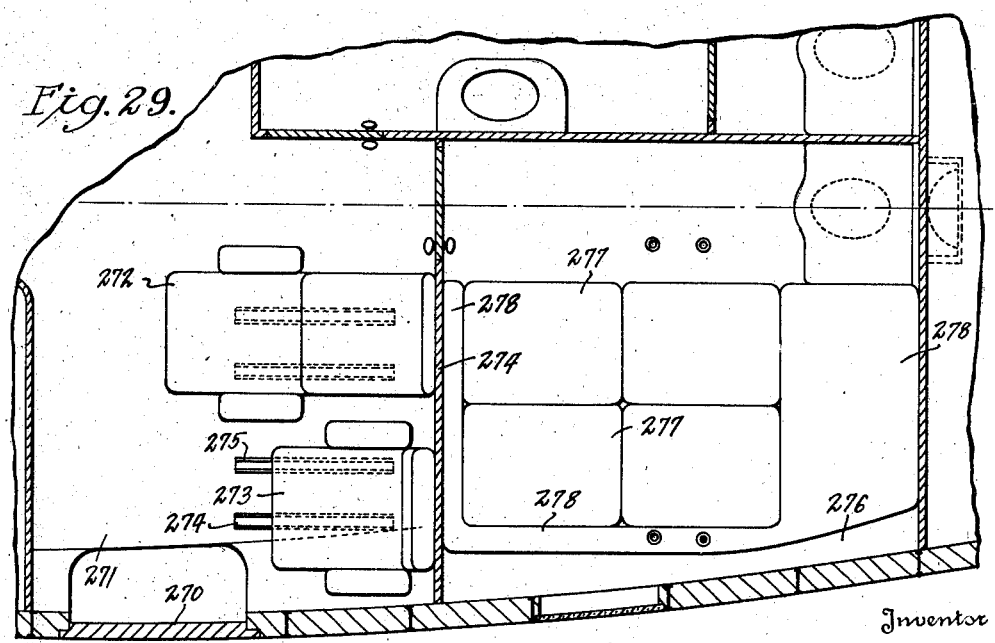

Patented Apr. 21, 1942

2,280,065

UNITED STATES PATENT OFFICE 2,280,065

VEHICLE

Trimble de Roode, New York, N. Y.

Application April 10, 1937, Serial No. 136,181

7 Claims. (Cl. 244—118)

This invention relates to passenger accommodations for transport planes, ships, trains, motor buses, and other vehicles where a relatively large number of people are to be taken care of in a limited space for both day and night travel.

It is one of the principal objects of this invention to provide passenger accommodations within limited space which will be comfortable for day travel and which can be converted into equally comfortable berths for night travel.

A further object is to provide chairs adjustable to suit the comfort of day passengers and each group of three of such chairs or group of three pairs of such chairs is adapted to be converted into two berths for night travel. In other words, each three chairs or three pairs of chairs may be converted into two berths.

A further object is to divide each chair into a pair of chairs arranged side by side with sufficient space between each pair of chairs for the placing of an arm rest of sufficient width to provide a comfortable support for the two occupants of the chairs; to arrange for the removal of the arm rest and shifting of the chairs together when the chairs are to be converted into berths. To provide each chair with independent means for independently reclining it to suit the comfort of the occupant and to be easily and conveniently adjustable by the occupant when a change of reclining position is desired, and to arrange the chairs to be convertible into berths easily and quickly without requiring additional cushions. The cushions incorporated in three chairs or pairs of chairs are sufficient to make two full berths.

A further object is to provide a convertible chair or pair of chairs which can be manipulated to form a berth with the chair or pair of chairs forwardly thereof whereby the chair, or pair of chairs, to the rear need not be disturbed nor deprived of their normal leg space.

It will be understood that each chair may be arranged as herein shown as a pair of separatable chairs or as a single chair of greater width without in anyway modififying this invention and therefore generally each pair of chairs will be referred to as a chair.

A further object is to provide convertible chairs wherein a series of three thereof may be formed into two berths and whereby the center chair with either of the other chairs may be converted into a berth without disturbing the other chair or its occupant.

A further object is to provide cushions either mounted permanently in horizontal position or hinged to the wall forming the end of the passenger compartment for completing a berth when one set of chairs is left over when all of the berths are made up.

In some layouts it may be of advantage to leave a pair of seats which are not formed into a berth so that passengers may sit up during the night.

A further object is to provide an upper berth for each lower berth and which upper berth can be closed out of the way during day travel; also to provide curtains giving the occupants of the upper and lower berths a private dressing space, together with complete privacy.

A further object is to use the arm rests of the chairs for providing a flight of stairs for the occupant to comfortably reach the upper berth, the upper step of which is the center arm rest which is of sufficient width to provide a foot-rest for the occupant of the upper berth for convenience in dressing and undressing.

A further object is to provide day and night accommodations which will give the maximum of seating and sleeping capacity within limited space, which will be comfortable for the occupants for both day and night travel, and which will be safe, strong, and light in weight.

A further object is to arrange the convertible chairs whereby suitcases or other articles may be placed thereunder when adjusted for day or night travel.

Other objects and advantages will be apparent as the nature of the same is more fully understood from the following description and accompanying drawings, wherein is set forth what is now considered to be a preferred embodiment. It should be understood, however, that this particular embodiment of the invention is chosen principally for the purpose of exemplification and the variations therefrom in details of construction and arrangement of parts may accordingly be effective and yet remain within the spirit and scope of the invention as the same is set forth in the appended claims.

In the drawings:

Fig. 1 illustrates the invention applied to the passenger compartment of an air liner.

Fig. 2 illustrates a vertical sectional view of Fig. 1.

Fig. 3 illustrates an enlarged fragmental sectional view taken in the plane of line 3—3 of Fig. 1.

Fig. 4 illustrates an enlarged fragmental sectional view taken in the plane of line 4—4 of Fig. 1.

Figure 5:
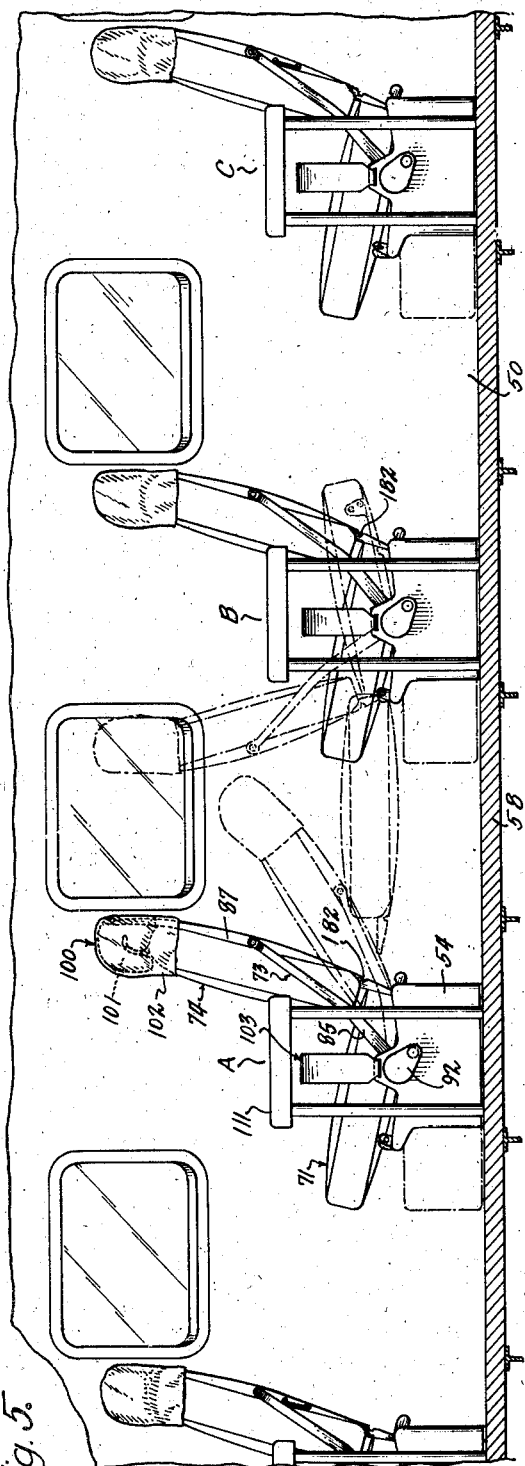

Fig. 5 ilustrates an enlarged vertical view of several of the convertible chairs and indicating in broken lines the different positions the chairs may be adjusted.

Figure 6:
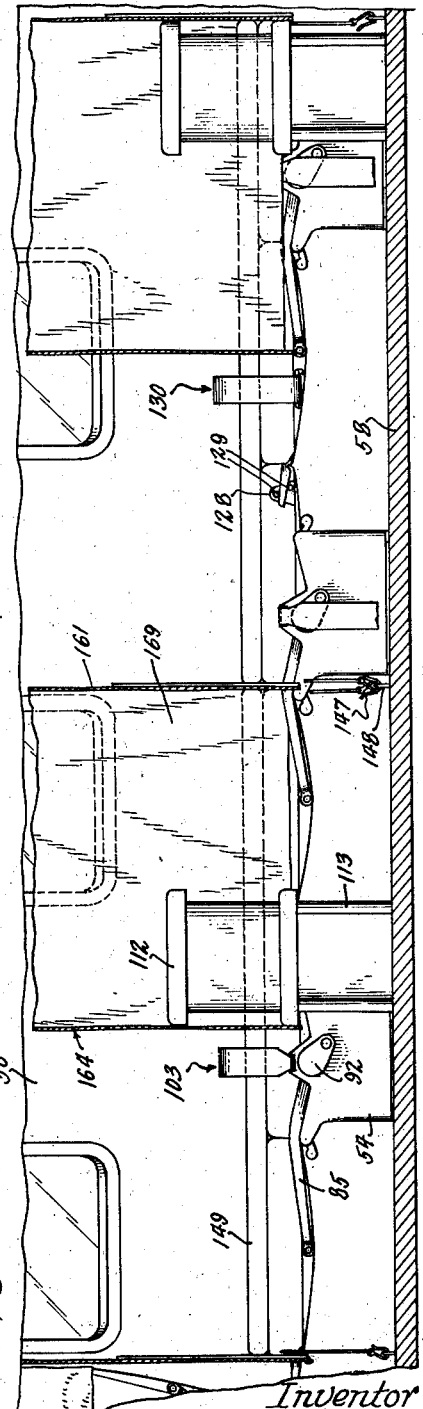

Fig. 6 is similar to Fig. 5 but illustrates the manner of forming two berths from three of the chairs.

Fig. 7 illustrates an enlarged fragmental view partially in section of one of the back cushion structures as it would appear when adjusted to form a portion of one of the berths.

Fig. 7a is a view similar to Fig. 7 but showing the back cushion structure of another of the chairs as it would appear when adjusted to form the second berth.

Fig. 8 illustrates an enlarged fragmental partially sectional view of the aisle chair of the pair and the manner by which it is moved into contact with the window chair.

Fig. 9 illustrates a fragmental partially sectional view of the aisle chair and showing the chair frame and its supporting tracks which permit movement into close contact with the window chair.

Fig. 10 illustrates a fragmental view of the chair in detail.

Figure 11:
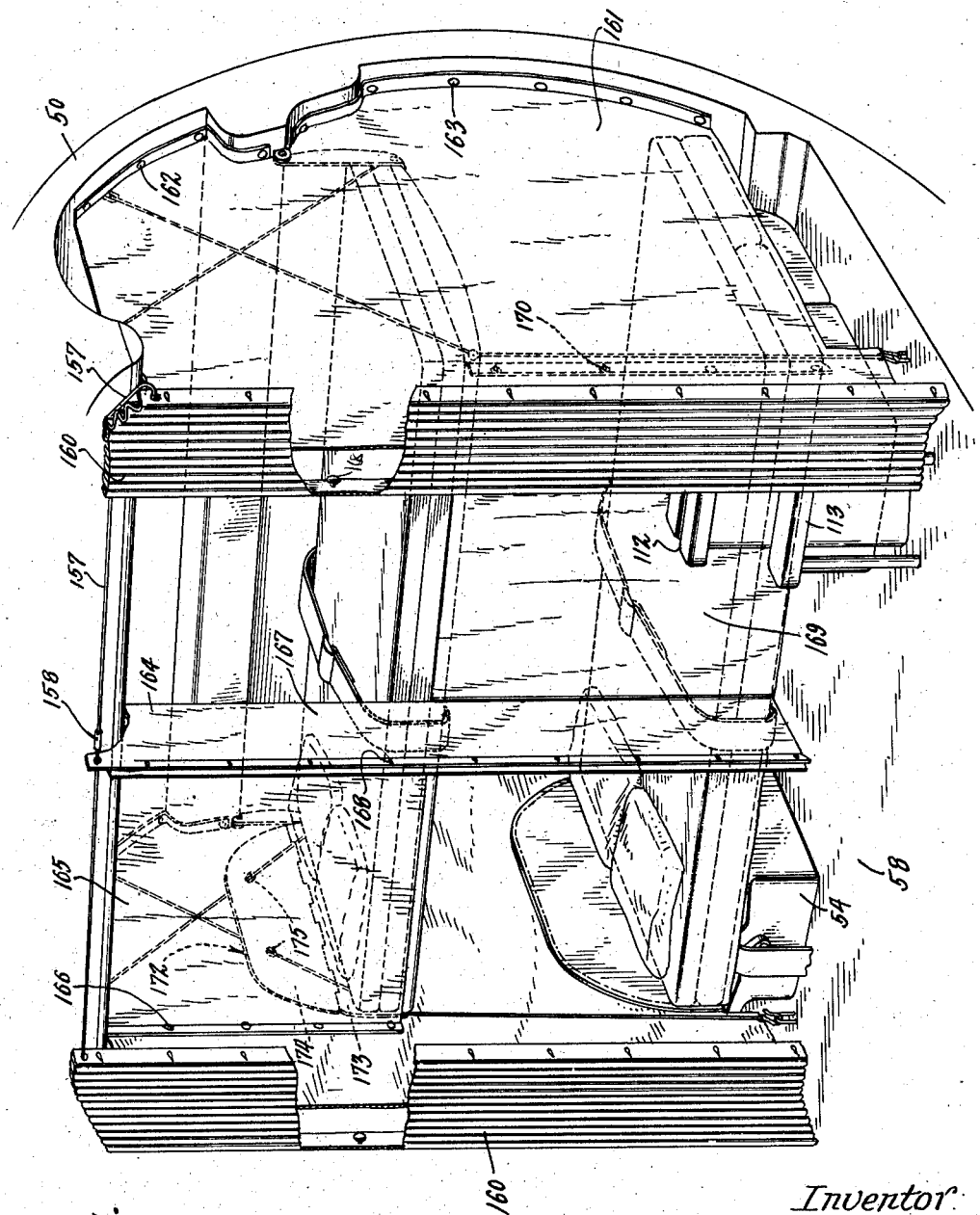

Fig. 11 illustrates in perspective one of the upper and lower berths and the curtains therefor.

Fig. 12 illustrates a sectional plan view of the passenger compartment of a transport plane, which has been equipped with a modification of this invention.

Fig. 13 illustrates a vertical sectional view of Fig. 12.

Figure 14:
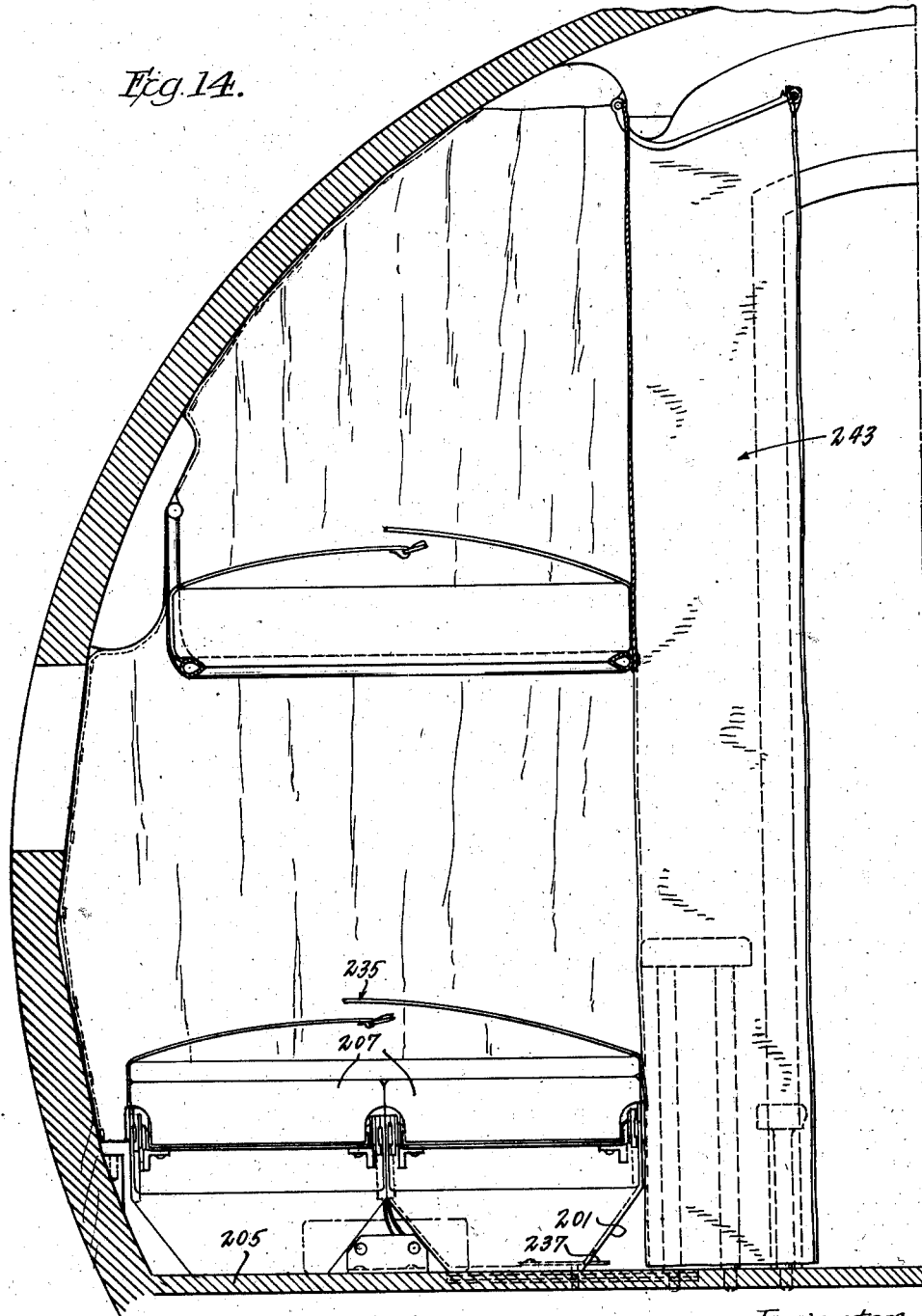

Fig. 14 illustrates an enlarged sectional view taken in the plane of line 14—14 of Fig. 12.

Fig. 15 illustrates an enlarged sectional view taken in the plane of line 15—15 of Fig. 12.

Fig. 16 illustrates, on an enlarged scale, one of the convertible chairs.

Fig. 17 illustrates the upper back portion of Fig. 16.

Fig. 18 illustrates in full lines one of the convertible chairs and in broken lines some of the different positions to which it may be adjusted.

Fig. 19 illustrates the escapement means for controlling the position of the seat.

Fig. 20 illustrates the sectional view of Fig. 19 taken in the plane of line 20—20 of Fig. 19.

Figure 21:
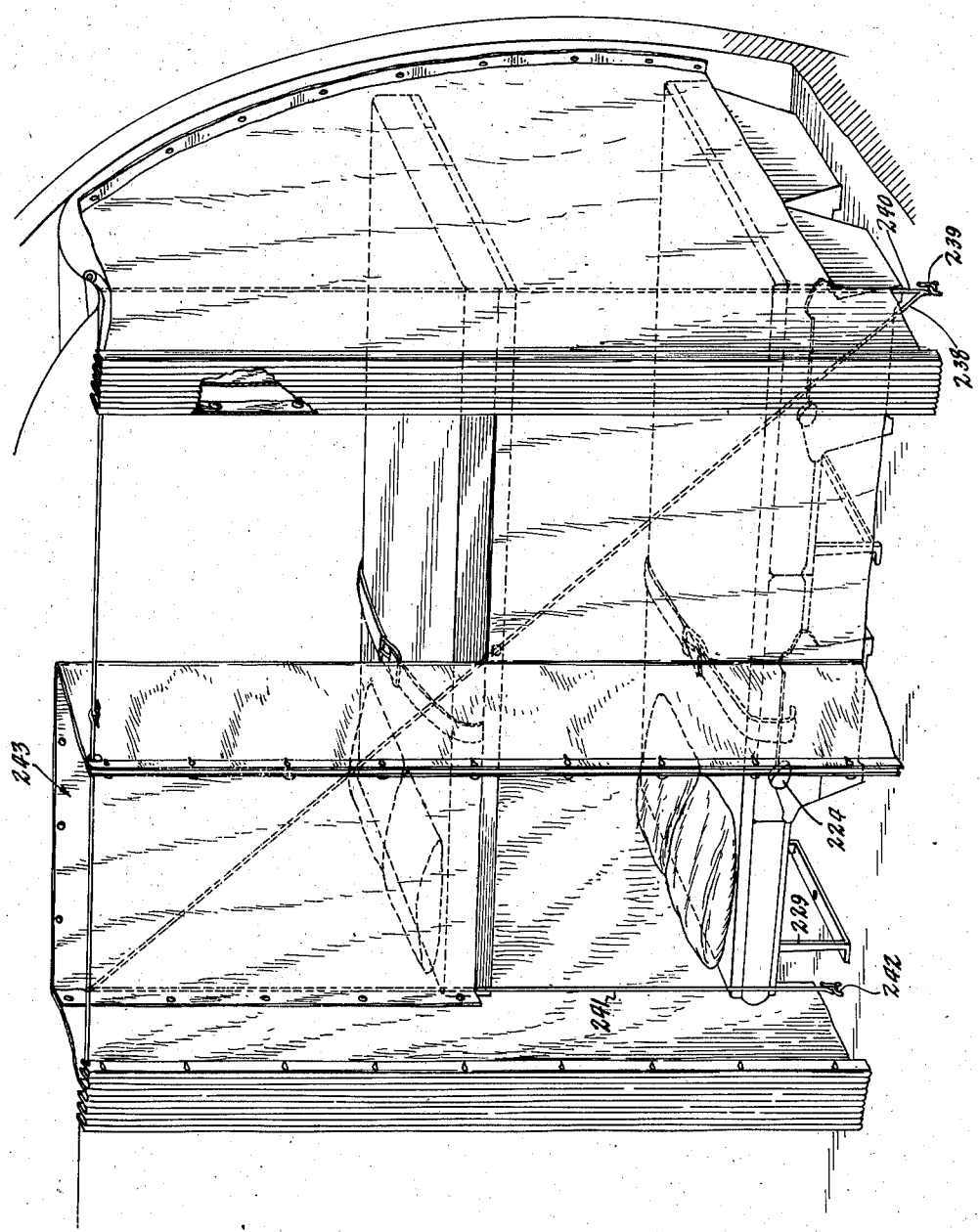

Fig. 21 llustrates in perspective the upper and lower berths, the curtains and brace-wires therefor.

Figs. 22 and 23 illustrate the different arrangement of the curtains for use in trains where the direction of travel may be forward or backward.

Fig. 24 illustrates a fragmental view of the manner in which the arm rests may be arranged to provide a flight of stairs for the occupant to reach the upper berth.

Fig. 25 is a diagrammatic illustration, showing the manner in which the seat may be adjusted to form the berth.

Figure 26:
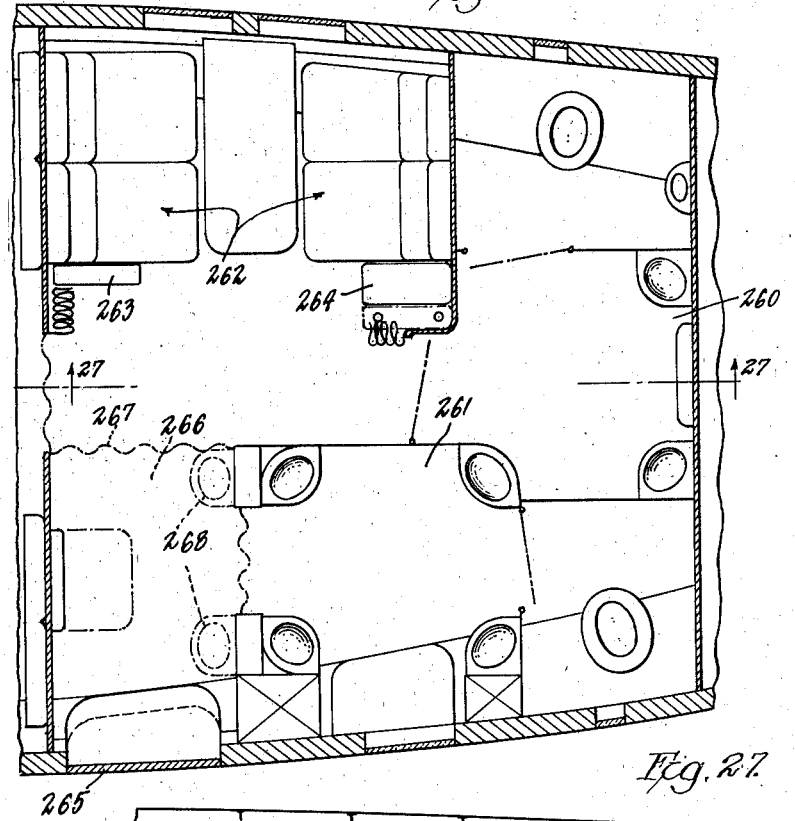

Fig. 26 is a plan view in section, showing the invention applied to a drawing room for an air liner.

Figure 27:
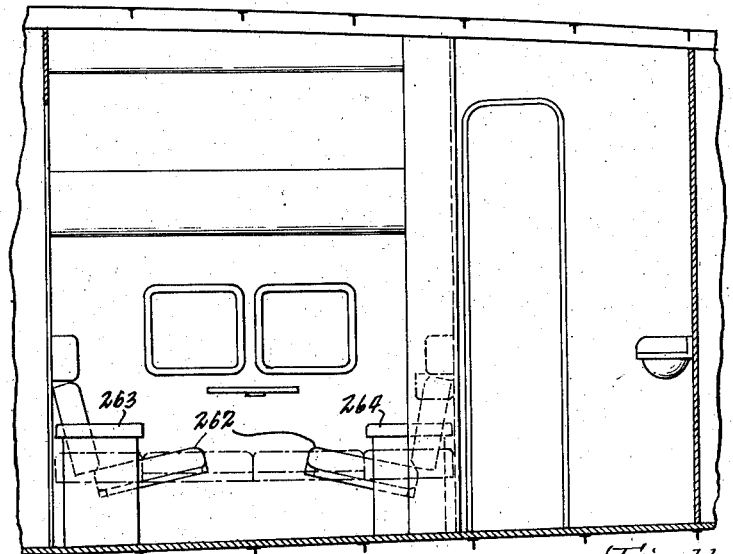

Fig. 27 illustrates a vertical sectional view of Fig. 26.

Figs. 28 and 29 illustrate fragmental sectional plan views of a modified form of the entrance portion of the vehicle.

In the modification of the invention illustrated in Figs. 1 through 11, the invention has been shown as arranged in a transport plane but it is to be understood that it may be used in any other form of vehicle or place where a large number of people are to be accommodated for night and day within limited space. It will be understood that the number of chairs and the arrangement of the chairs can be changed to suit the size and shape of the passenger compartment in which they are assembled without in any way changing the inventive concept.

In Fig. 1 the hull of the air plane is indicated at 50 as being of standard construction and having windows 51. The main cabin is of sufficient length and width to accommodate two rows of chairs 52, each row having 10 chairs in line so that for day travel the main cabin can accommodate 40 passengers. It will be noted that the row of chairs on each side of the ship is divided and it is to be understood that if preferred each pair of chairs may be arranged as single units with or without arm rests therebetween. However, it is preferable to provide chairs of the divided type. Thus each row will have two chairs in side-by-side relation with sufficient room therebetween for a full sized arm rest to be provided for the passenger occupying each of the chairs in the pair. It will be understood that where I mention in this specification "a chair" it may be considered to include a pair of chairs such as shown in Fig. 1, or a single chair of substantially the same width.

Figs. 1 and 2 illustrate the manner in which three of the chairs may be manipulated to provide two berths which in these views are indicated at 53. It will be understood that for each three sets of chairs two berths may be made up. As each row includes 10 chairs or three groups of 3 chairs each, and that two berths may be made up for each group of 3 chairs, it follows that for each of the two rows, six berths can be provided, or in all 12 lower berths, with an equal number of upper berths, making 24 berths in all. In each row of chairs one pair will be left after all berths are made up to accommodate passengers not requiring berths.

It will be understood, however, that in place of the ten sets of chairs in each row, only nine or multiples of three may be provided so that berths will be made up for all of the chairs, thereby providing an extremely flexible arrangement; or, where the number of chairs is to exceed a multiple of three, additional cushions may be provided to make up a complete berth for the odd chair, or chairs, left over.

Referring to Figs. 4 through 7, the construction of the chairs is clearly shown therein to include side frames 54 for the aisle chair of the pair which at its front and rear portions is provided with vertical supporting tubular sections 55 having T-sections 56 fastened to the lower ends thereof, as clearly shown in Fig. 9, and arranged to slide in T-slots 57 formed in the floor 58 of the vehicle, whereby the aisle chair may be shifted to engage the side of the window chair 59 which is preferably fixedly mounted in the vehicle. The window chair 59 is provided with side frames 60 which are substantially of the same construction as those comprising the side frame members of the aisle chair 61 excepting that they are not provided with the T sections 56. The seat frames 60 are provided with cross tubes 62 front and rear, from which projects the supporting tubes 63 which are slidably mounted in the cross tubes 64 formed at the front and rear of the frames 54 of the aisle seat 61, and provide a bracing and locking means for the aisle seat. One of the chair frames 54 of the aisle seat is provided with a spring latch 65 (Fig. 8), adapted to engage a hole or other detent means 65a formed in the supporting tube 63 whereby the chair 61 will be releasably locked in either of its adjusted positions. In other respects the aisle and window chairs are substantially of the same construction and therefore the description of the aisle chair will cover the description of the window chair.

The cross tube 64 is provided intermediate of the frame 54 with a sleeve 67 carrying a short tube 68 connected by means of arms 69 and, as shown in Fig. 4, constitutes what may be referred to as seat bracket 70 for the purpose of giving seat cushion structure 71 a comfortable slope. It will be noted that each of the cross tubes is provided with one of these seat brackets. However, one only is made use of at a time. The one not in use is swung to be clear of the cushion structure 71, as shown most clearly in Fig. 9. Interposed between the chair frame 54 is a cross tube 72 which not only acts as a reinforcement for the seat frame but also provides a point of support for the seat cushion structure as well as a pivotal support for the supporting frame 73 which carries the back cushion structure 74.

The construction of the seat cushion structure 71, and its manner of mounting upon the chair frame, will now be described: This structure is provided with a dish-shaped metallic bottom plate 75 having formed therein, or otherwise provided, transverse semicylindrical depressions 76 (Figs. 8 and 9) for engagement with the cross tube 72 and the seat bracket 70 whereby the seat structure is keyed to these elements and thereby prevented from moving. The member 75 is releasably latched to the cross tubes 72 and 68 by means of the latch spring 77 which is pivotally connected to the member 75 by any suitable pivot means 78 (Fig. 9). To suitably support the spring latch 77 the dish member 75 is provided with a circular flange portion 79 against which the surface of the spring latch may bear to assist in maintaining the latch securely in engagement with the members 72 and 68 and also for holding the latch in its proper position when swung to release the cross tubes when the seat is to be positioned for the making up of a berth, or when the seat is to be reversed, as will be later described.

In Fig. 8 it will be noted that the seat cover 80 may be fastened to the dish member 75 in any suitable manner to enclose sufficient cushion material 81 to provide a comfortable seat cushion.

Referring to Fig. 9 it will be observed that the cross tube 72 is equally spaced between the cross tubes 64 so that the cushion may be positioned as shown in Fig. 9, or its position may be reversed, as shown in broken lines in Fig. 5, in which figure the cylindrical depressions will engage the center cross tube 72 and the opposite seat bracket or support 70 from which it was originally supported. Due to this construction, the seat cushion structure may be positioned for the occupant to sit either forward or backward in the seat; in other words, the seat may be reversed. The back cushion structure is also reversible, thereby making the seat flexible for different directions of travel and conditions. Such, for example, as when a group of passengers wish to face each other for conversation or for playing cards, as is shown in Fig. 1 by the group of chairs indicated by 82, or as shown at 83, where one of the pair of chairs may be faced forward while the other is faced rearwardly, thus giving a very flexible chair arrangement which will readily accommodate the needs of the occupants. The structure for supporting the back cushion structure includes the cross tube 72 which tube forms one portion of the supporting frame 73 having outwardly extending arms 85 securely fastened to each end of the tube. The free ends of the arms 85 are connected by suitable pivot means 86 to the back cushion structure 74 thus permitting the structure to pivot with relation to the arms 85. The back seat structure 74 may include side frames 87 providing a firm support for the pivotal connection with the arms 85 and also for mounting of the upholstery 88 of the back cushion. As may be observed most clearly in Figs. 7 and 7a, the side frames 87 of the back cushion structure 74 extend beyond the cushion 88. The lower end portions of members 87 latch behind the cross tube 64 and pivot about this tube during the adjustment of the back seat structure to different inclinations. The end portions of member 87 are used to support the back cushion structure when the seat is manipulated to make up a berth.

Suitable cross bracing means, not shown, may be used for providing a rigid frame to which the cushion 88 is fastened in any suitable manner. The back seat structure can be adjusted from its most upright position, as indicated in full lines in Fig. 5, to its maximum inclined position when used as a chair, as indicated in broken lines in this figure, or may be positioned horizontally when used to make up the berth, which position is indicated in broken lines for the third chair in Fig. 5, or for the three chairs in Fig. 6. Any form of means for controlling the adjustability of the seat back structure may be provided. The preferred form shown herein includes fastening upon one end of shaft 84 an escapement wheel 90 having teeth 91. The escapement wheel is enclosed within an escapement member 92 pivotally connected to one of the chair side frames by pivot means 93 and having stop teeth 94 and 95 so arranged that when oscillated back and forth about its pivot the escapement wheel will be permitted to advance the distance of one tooth for each oscillation of the member. The escapement member 92 is positioned on the side of the chair frame in convenient reach of the occupant so that by pressing upon the back cushion structure and oscillating the escapement member 92 the back structure will become inclined until such a position is reached as suits the comfort of the occupant where, upon release of the escapement member, the back structure will be locked.

A torsional spring 96 is provided surrounding the cross tube 72 and having one of its ends fastened to the adjacent chair side frame 54, while its other end may be inserted through a suitable hole formed through the cross tube 72 and shaft 84, thereby acting to rotate the shaft and cross tube as a unit, the end of the spring which projects into the cross tube and shaft acting to lock these two members together. The spring 96 is tensioned to yieldingly urge the back structure into a vertical position. Therefore, to return the back structure to a more vertical position, the occupant need only to remove all pressure from the back structure and to oscillate the escapement member 92, thus permitting the spring 96 to return the back structure to a desired position. The spring 96, as stated, is arranged so that when the seat structure is in a vertical position substantially no tension will be left in the spring. However when the seat structure is swung to either side of its center position, tension will be developed in the spring tending to return the back structure to its vertical position.

However, if preferred, two springs may be used in place of the single spring, one to act upon the back structure when adjusted to one side of its vertical center, and the other to act upon said structure when angles to the other side of its center position.

The ends of the side frames 87 of the back cushion structure which extends above the cushions 88 are used normally to provide for the support of a suitable head rest 100 as shown in the second chair of Fig. 5, where it will be noted that the head rest pillow 101 is folded down so as to rest upon the upper end of cushions 88 between these two ends of the structure frame and held in place by means of a pillow case or bag 102 slipped over the pillow frame ends and upper portion of cushion 88 and fastened by any suitable means, not shown.

Each chair is provided with a safety belt 103 formed of two straps 104 and 105 which may be adjusted to fit the wearer by means of a buckle 106.

Referring especially to Fig. 4, it will be noted that the strap 104, which carries the buckle 106 of chair 61, is fastened to a suitable eye 107 formed at the upper edge of the chair frame 54, while the shorter strap 105 is fastened to a similar eye formed at the upper edge of the opposite chair frame.

It will also be noted in this figure that for the window chair 59 the arrangement of the straps is just reversed. That is, the strap 108, which is the long strap, is fastened to the farthest chair frame 60, while the short strap 109, carrying the buckle 110, is attached to the opposite chair frame 60.

When the chairs are moved together for the purpose of making up a berth, the short straps 105 and 109 are permitted to fold down on the berth cushions while the straps 103 and 108 are used to hold the occupant within the berth. Each chair is provided with arm rests which are clearly shown in Fig. 4, wherein the arm rest 111 is positioned to the aisle side of the chair 61 and positioned between the two chairs is an arm rest 112 of double width so that it may be used by occupants in each of the seats without interfering with each other. The window chair 59 is provided with an arm rest 113 which is supported on a bracket 114 projecting from the side of the hull 50.

It will be noted that the legs 115 of the arm rest 113 are considerably shorter than the legs for the other two arm rests, and is made to form the first or lowermost step in the flight of steps for the occupant of the upper berth. Each of the arm rests is removably mounted in the floor 58 of the vehicle by providing suitable sockets 116 in the floor having snap recesses 117, and each of the legs of the arm rests is provided with a projection 118 having a spring groove 119 for the usual snap spring 120 so that when the arm rest is positioned in the socket it will be releasably retained therein. This form of spring catch is common in the art and will be well understood.

As may be noted in Fig. 4, the center arm rest 112 is positioned in the floor recesses 121 in order to permit this arm rest to be of slightly longer length, this additional length being found of advantage when the arm rest is used for a step, in which location the arm rest is not recessed but rests upon the top surface of the floor. (In this relation note Fig. 11.)

As previously stated, the chairs may be reversed so that the occupant may, at will, face forwardly or rearwardly. The chair is reversed by first removing the pillow case 102, the head rest pillow 101, actuating the escapement member 92 until the back structure reaches its most upward position, and thereafter, while continuing the oscillation of the escapement member, manually urging the back to continue in its movement until the extending end of the back structure frames 87 are released from the cross tubes 64, whereupon the back structure may be swung about its pivot means 86 until the upper extending ends of the frame can be guided to engage the inner surface of the opposite cross tube 64 and the motion continued until the seat has reached the desired position of adjustment when the head rest 100 may be fastened upon the angled forwardly extending frame end, as previously described.

While the extending ends of the back structure frames 87 are released from the cross tubes the seat structure 71 should be released by turning the spring latch 77 to free the latch from the cross tube 72 and seat bracket tube 68 whereupon the seat structure can be shifted until the cylindrical depressions 76, which formerly engaged the tube 68 of the seat bracket, and the cross tube 72 will now engage the opposite seat bracket 70 which may be brought into engagement with the cylindrical depressions 76 which formerly rested upon the cross seat 72. The seat being positioned the spring latch 77 will be returned into locking engagement with the cross tube 72 and tube 68 of the seat bracket 70.

In Fig. 5 the third chair illustrates, in full lines, the chair facing forwardly, while in broken lines the chair is illustrated in its reverse position.

The convertible chairs of this invention may be easily and quickly manipulated to convert three chairs into two berths by the following operation: First the three arm rests 111, 112 and 113 are removed and set aside until the berth is made up when they are inserted in additional sockets in the floor 58 for the placing of the short arm rest 113 and the wide, middle arm rest 112 in the position shown in Figs. 1, 2, 3 and 6 to provide a flight of stairs for reaching the upper berth. As the center arm rest 112 is of double width it provides a convenient foot-rest for the occupant of the upper berth while sitting on the side of such berth while putting on or removing his shoes, socks and the like.

The next operation will be to release the three seat structures by rotating the spring latches 77 and then swinging the back structure of the first chair, which is designated A in Fig. 6. During this movement it will be advisable to move the seat structure of this chair rearwardly until the cylindrical depressions 76 rest upon the center cross tube 72 and the rear cross tube 64. It will be noted in this instance that the seat bracket 70 is not used so that the seat cushion will be positioned in a horizontal plane as shown in Fig. 6. The seat structure will be locked in this position by the spring latch 77 clamping under the cross tubes 72 and 64 in the manner previously described. To lock the back structure in its horizontal position for forming the berth, a pair of spring latches 125 (Fig. 7) are provided upon each side frame of the chair. Each spring latch has a horizontally projecting latch pin 126 adapted to engage a suitable recess or opening 127 (Fig. 5) in the extending portion of the back seat frame rods 87, therein releasably locking the inner end of the back seat frames 87 against movement.

It will be observed in Fig. 7 that the arms 85 which pivotally support the frames 87 will rest upon the top of the cross tube 64 when the back is in its horizontal position. In this way the portion of the berth formed by the back structure is securely and positively supported; also the side portion is securely latched to the chair frame so that in case the vehicle should fly in upside down condition the berth will be prevented from falling out of position, the occupant being held therein by the safety belt as previously described.

The next chair B (of Fig. 5) is now ready to be manipulated to complete the first berth. The back structure of chair B may now be swung to its horizontal position, as illustrated in Fig. 6, and during this movement the seat structure for this chair may be shifted and relatched to the chair frame in the manner described for chair A. The front chair A, with its back and seat structures arranged in a horizontal plane, together with the back structure of chair B, forms, as may be apparent from Fig. 6, one berth. Thus it will be understood that the cushion structures from one and a half chairs are sufficient for the completion of one berth and that the second berth is completely formed from the remaining cushion structure, which includes the two seat cushions and the back cushion of the middle and rear chairs. Chairs B and C are manipulated in the same manner as described for chair A to form the second berth. In this instance, however, the forwardly extending portions of the back cushions frame rods 87 are supported by a spring bracket 128 carried by the seat cushion structure of chair B which may be clearly observed in Fig. 6. This spring latch 128 carries two pins 129 between which the ends of frames 87 are positioned, thus securely locking the two structures together. This is found necessary for the second berth because it will be observed that the life belt 130 is attached approximately to the center portion of the back seat structure and must support the weight of the occupant should the plane fly in upside down condition.

The necessity for the spring latch 128 will be readily appreciated by comparing the position of the life belt 103 for the first berth, which belt is connected directly to each side of the chair frame with the second life belt 130 connected to the back cushion structure of chair C instead of to the chair frame and therefore must depend upon adequate locking means to securely maintain this portion of the structure against displacement when subjected to heavy loads.

Should the occupant of the first berth wish to retire at an early hour the first berth can be made up without disturbing the occupant of the third chair who need not be disturbed until the second berth is to be made up which may take place at some later hour; or, conversely, the second berth may be made up without disturbing the occupant of the first chair, thereby providing a flexible and convenient arrangement for the chairs and berths.

For each lower berth there is a corresponding upper berth 140. In Fig. 4 is shown a sectional view of one of the upper berths folded into the vehicle side. The recess 141 into which the upper berth is folded may be of any appropriate shape to best suit the construction of the vehicle and may be placed somewhat differently from that shown in this figure without in any way modifying the essential features of this invention. As the construction of each of the upper berths is the same, only one will be described. The upper berth is supported and carried upon a compound hinge member 142, which is preferably hinged along one edge to the vehicle by means of a continuously extending hinge pivot 143 and to the framework 144 of the upper berth by a continuously extending hinge 145. The continuous hinges 143 and 145 are of the piano type. That is, they extend for the full length of the upper berth and the compound hinge member 142 also extends for this full length and acts not only as a hinge member but also as a cover means for enclosing a portion of the upper cavity 141. The upper berth may be latched in its closed position by any preferred form of latch means, not shown, and when lowered to its open position, as shown in Fig. 3, is securely supported not only upon the compound hinge but also by the cable or guy wires 146 and 147 which extend from suitable connecting means fastened to the vehicles to opposite corner of the lower frame, while the guy wire or cable 146 extends from the inboard corner of the upper berth frame to the floor where it is secured under tension by means of a hook 147 engaging a ring or eye 148 fastened to the vehicle floor.

It will be observed in Fig. 3 that the ends of guy wires 146 and 147 are attached to the vehicle in spaced relation and form more or less of a cross while extending to the opposite corners of the upper berth frame. This arrangement, together with the extension of the guy wire 146 to the floor where it is fastened under tension, prevents any tendency of the upper berth to sway or rock with the movement of the vehicle or due to the movement of the occupant of the upper berth. In Fig. 3 it will also be observed that the compound hinge member 142 acts to separate the lower berth compartment from the upper berth compartment.

Referring to Fig. 4, it will be noted that the upper berth cavity, together with space made possible by the compound hinge member, provides ample room for the storage of the lower berth top mattress 149 and also provides space for the top mattress 150 for the upper berth, as well as for the necessary curtains for enclosing the berths.

The upper berth frame 144 includes an outer edge member 151 more or less oval in cross section (Fig. 4) to which is suitably fastened in any appropriate manner, a connecting sheet of material 152. The frame with its sheet are convex generally in cross section (Fig. 4) to serve two purposes, the first to mold the upper berth generally to the contour of the inside of the vehicle, and second, to provide room for a submattress 153 which, due to this convex curvature of the frame, is thickest at the longitudinal center portion of the berth, thereby providing the greatest amount of mattress material for the comfort of the occupant along the longitudinal center of the berth, which portion of the berth is most commonly used by the occupant.

At one end of the upper berth cavity 141 is mounted a bracket 154 to which is pivoted the curtain supporting arm 155. Referring to Figs. 3 and 4, it will be observed that when the upper is closed the curtain bracket 155 may be swung into the cavity so as to be completely concealed from view and when the upper is lowered the bracket may then be swung to its curtain supporting position, as illustrated in Fig. 3. The curtain supporting arm 155 will be releasably latched in each of these positions by any suitable or common form of latching means, not shown. Each of the curtain supporting arms 155 is provided with a cord eye 156 through which extends the curtain cord 157 (Fig. 11). The curtain cord 157 extends equally from each side of the brackets and the separate cords of the several brackets are connected together by any suitable form of hook or connecting means 158 as shown in Fig. 11. Mounted upon the curtain cords and equally divided to each side of the supporting arms 155 extends the main vertical curtain 160. The curtain is slidably mounted on the cord so that it may be retracted as shown in Figs. 1 and 11, or extended to be joined in the center as shown in the third berth of Fig. 1. Each of the curtains 160 is provided with an end curtain 161 securely fastened to the walls of the vehicle above the continuous hinge 143 by any suitable means, such as those shown at 162, and is detachably connected to the side of the vehicle by any suitable means 163. When the berth is to be closed the curtain 161 will be unfastened from the vehicle wall below the hinge member and together with the curtain 160 will be placed onto the upper berth and when such berth is closed, will be out of sight.

One each of the curtains 160 and 161 will be folded into each of the upper berths. A dividing curtain 164 may be used to separate the occupants of the upper and lower berth and this curtain may include a longitudinal upper section 165 which closes the upper berth from the end curtain to which it is fastened by means 166 to the center division curtain portion 167. The curtain 164 is also provided with a lower longitudinal section 169 which closes the opposite portion of the lower berth from the upper berth and extends from the center dividing portion 167 to the end curtain 161 to which it is fastened by suitable fastening means 170.

It will be understood that when it is desired to use the upper and lower berths as one compartment the dividing curtain 164 need not be used, in which case the compartment may be closed by drawing the curtains 160 together and fastening their adjacent edges by buttons or other suitable means.

Each of the supporting arms 155 is provided with a notch 171 for receiving the curtain cord 157 when the adjacent berth has not been made up; in this way holding that portion of the curtain 160 draped out of the way of the occupants of adjacent chairs.

It will be understood that the upper berth is provided with the usual form of life belt.

Figs. 3 and 11 clearly show the manner of providing end boards 172 at the head end of each berth. In these figures the end boards for the upper includes a lower portion 173 which is fastened to the end of the upper frame 144 to which is hinged the upper end board 174 having holes 175 therethrough for the passage of the guy wires 146 and 147. By this arrangement as the berth is closed the end board 174 may be folded in out of the way, and when the upper berth is lowered the guy wires 146 and 147 will act to automatically open and hold the end board in place. The end board for the lower berth is fastened to the end curtain 161 in any suitable manner and is placed onto the upper berth with the curtain when the berths are put away.

Of course it will be understood that the usual blankets and pillows will be stored in the upper berth compartment, except such pillows as are used to form the headrests of the chairs.

The arrangement of the curtains provides a dressing space for the occupant of each berth which is completely shut off from the occupant of the other berth. The occupant of the lower berth may enter his berth at the head end thereof, while the occupant of the upper berth will enter his berth at the foot end thereof, and is provided, as has previously been pointed out, with a flight of stairs formed by the arm rests in a manner also previously described, whereby the occupant of the upper berth will have a convenient space to undress and dress, and a flight of stairs for easy access to his upper.

It will be observed from Figs. 3, 6 and 11 that ample space is provided under the lower berth for the storage of suit cases and also for the storage of the arm rest 111 which is not used when the berths are made up.

In some installations it may be desirable to provide means for yieldingly maintaining the escapement member 92 at each end of its oscillatory stroke. As will be appreciated, any of the wellknown forms of yielding latch means may be provided. However, I prefer to use the usual form of overcenter spring, and for this purpose I provide on the chair frame a lug 180 which projects into the open space of escapement member 92 and to provide a spring blade 181 to engage suitable notches formed in the lug and in the pivot bearing bosses of the member. As is common in this form of the construction, the spring 181 is slightly longer than the distance between the notches formed in the lug and bearing boss when the escapement member 92 is in the central position. Due to this arrangement the escapement member will be yieldingly maintained at either extremity of its oscillatory travel. However, as previously stated any other simple form of means to accomplish this purpose may be provided.

Attention is directed to the notches 182 formed adjacent the ends of the back cushion structure frame member 87 which serves the purpose of engaging suitable openings 183 formed in the head boards for the lower berth and act to hold the curtain and end board taut and in correct position, as is clearly shown in Figs. 7 and 7a.

Another feature which is most clearly shown in Figs. 3 and 4, is the provision of a metallic skirt 184 around the two legs of the center arm rest 112, and extending outwardly from the legs to form a cross section either triangular or rectangular configuration, and extending from the cushion portion of the arm rest to engage the floor when the arm rest is positioned in its socket 116. This skirt serves the purpose of stabilizing the arm rest when used as one of the steps in the flight of stairs leading to the upper berth However, instead of using the plate to stabilize the arm rest, it may be provided with three or four lugs, instead of two. This, however, is not the preferred form, as it requires additional sockets in the vehicle floor.

By referring to Figs. 1 and 2, it will also be noted that by placing the flight of stairs at one end of the standing space for the occupant of the upper berth, for the first berth, and at the opposite end for the second of a set of berths made up from three chairs, that only two additional sockets need to be provided in the floor for the first steps formed by the arm rest 113, as it is possible to use one of the floor sockets of the arm rest 111, for the other leg of the arm rests 113 which form the two lower steps. Of course it will be necessary to provide two sockets for each of the second steps formed by the arm rests 112.

In the modification of my invention illustrated in Figs. 12 through 21, I have shown the form of the invention which I developed prior to the development of the preferred form hereinbefore described, and this modification includes substantially all of the novel features of the preferred form. However, the modified form contains certain structural differences which will be pointed out. It is not believed to be necessary to repeat the description of those structural features which are identical with the preferred form.

One of the principal differences resides in the construction and arrangement of the convertible chairs. In this modification the chair frames 200 are formed of end plates 201 connected by side and bottom plates 202 and 203 and as may be observed from Fig. 15 the chair frames 200 may be inclined inwardly. Like in the preferred form the aisle chair 204 may be slidably mounted upon the vehicle floor 205. However, it is to be understood that if preferred the window chair 206 may be mounted for movement so that both chairs are moved together to form the berth, or the aisle chair may be fixed and the window chair may be movable only. In the arrangement illustrated in this modification, it is preferred to make the aisle chair 204 the movable one and to mount the window chair permanently in fixed position.

The principal difference in the convertible chairs of this modification resides in the structural arrangement of the cushion structures and in the form of operating mechanism. The seat cushion 207 is securely fastened to a rectangular frame member 208, while the back cushion 209 is securely fastened upon a rectangular frame member 210. The seat frame 208 is provided with spaced brackets 211 and 212, through which project cross shafts 213 and 214, respectively. The ends of these shafts are adapted to slide in camways 215 and 216, mounted upon or formed in the sides of the chair frames 200. The back cushion frames 210 are connected to the chair side frames 201 by means of links 217 and 218. The link 217 is pivotally connected to the chair frame at 219 and to the cushion frame at 220, while the link 218 is pivotally connected to the chair frame at 221 and the cushion frame at 222.

It will be understood that the links 217 and 218 are provided at each side of the chair and permit the back cushion to be inclined to various angles as illustrated in Fig. 16 and also to be swung to a reverse position as shown in Fig. 18, the two links effectively supporting the back cushion structure for each angular position. In order to lock the back cushion structure in a selected position, any form of locking means may be provided. For this purpose I prefer to use the escapement mechanism illustrated in Figs. 19 and 20 which includes an escapement wheel 223 securely fastened to the pivot shaft 219 of link 217 and the escapement member 224 of substantially the same form as described in my preferred form of the invention. Like in the preferred form, I provide the escapement mechanism with an overcenter spring 225 acting between a chair frame lug 226 and the bearings 227 through which bearing the pivot pin 228 for the member passes.

The operation of this device is substantially identical with that described in my preferred and therefore will be fully understood.

The back cushion frame 210 is provided with legs 229 at one end thereof and 230 at the other end.

Referring to Fig. 18 it will be observed that the legs 229 are used to support the outer end of the frame when the chair is manipulated in one direction to form the berth, while the legs 230 will be used in the same manner when the berth is formed in the opposite direction. The legs 229 and 230 are journaled to the frame 210 (Fig. 17) by bearings 231 to permit the same to be folded back against the frame when not used to support the head end, and the latch means 232 is provided for releasably locking the legs in their retracted position.

Referring to Figs. 16 and 17, it may be observed that the legs 230 are used to clamp a head rest pillow 233 to the outer end of the back cushion. It will be understood that when the chair is reversed the legs 229 can be used in the same way. With the adjustment of the back cushion 209 the seat cushion 207 will be forced forwardly or rearwardly, whereby the shafts 213 and 214 will traverse different portions of the arcuate cam slots 215 and 216 to give an adjustable angle to the seat cushions in proportion to the angular inclination of the back cushion. When the chair is converted into a berth, the shafts 213 and 214 move to either end of the cam slots, depending upon which way the chair is facing and the seat cushion may be elevated into the horizontal plane occupied by the back cushion, as may be clearly observed in Fig. 18 in broken lines. The back cushion frame 210 is provided with a safety belt 234 and the seat frame is provided with a safety belt 235. These safety belts may be arranged the same as in my preferred embodiment. The chair is adjusted to any angular position, forward or back, by actuating the escapement member while manually moving the back frame structure in the direction in which the adjustment is to be made. In the same way the chair can be positioned to form a berth, and it will be understood that the berth can be formed by swinging the back frame 210 backwardly into the position shown in Fig. 18 in broken lines. In other words, the berth may be formed forward of the chair or rearwardly thereof, and, as in my preferred embodiment, three chairs can be converted into two berths. When the chairs are adjusted to form a berth, the legs may be latched to the floor by latch pin 236 (Fig. 18), thereby locking the back cushion frame 210 securely to the vehicle floor. The aisle chair 204 may be locked at either end of its travel by any suitable latch means, as indicated at 237 in Figs. 15 and 16. The upper berth is of substantially the same construction as described for my preferred modification; also the same is true for the curtain arrangement.

In this modification I have shown a diagonal brace wire 238 extending from the ceiling of the vehicle directly above the head end of the upper berth to the floor, where it is securely fastened by means of a hook and eye device 239. The guy wire 238 has a branch guy wire 240 extending from the hook and eye 239 to the ceiling of the vehicle where it is securely fastened. In the same manner a guy wire 241 extends from the point of attachment of the guy wire 238 from the ceiling of the vehicle to the floor, where it is fastened by means of a hook and eye 242. The guy wires 241 are fastened to the outer end of the upper berth and act not only to support this berth, but also to prevent its swinging.

In this modification the division curtain 243 may be of the same type as that used in my preferred form, and it will be noted in Fig. 21 that the guy wire 238 crosses the opening of the upper berth in back of the portion of the curtain which encloses the upper compartment, and in back of that portion of this curtain which closes the lower compartment. In this way the guy wire is not in the way of the occupants of the upper and lower berths.

It will be appreciated that the convertible chairs may be differently arranged to provide the adjustment of the seat and back cushions without in any way departing from the spirit of this invention.

In Figs. 22 and 23 I have shown the manner of applying the division curtain 243 to a vehicle which may travel in either direction so that the head end of the berth may be always directed toward the line of travel of the vehicle. In Fig. 11 I have shown the flap 244 which encloses the upper half portion of the upper berth to the right-hand side of the division portion 245 of the curtain, and the flap 246 which encloses the foot end of the lower berth to the right of the division curtain 245, and it will be noted, in Fig. 23, that the flaps 245 and 246 have been reversed in their location to reverse the position of the head ends of the two berths.

In Fig. 24 I have shown the manner in which the three arm rests 247, 248 and 249 may be assembled to form a flight of stairs having three separate treads to provide easy access to the upper berths. The arm rest 249 may be provided with an extension section for its leg portion to give additional height, the extension section having sockets in which the legs of the arm rest may be releasably latched.

In Fig. 25 I have illustrated a row of 10 chairs and as it requires three chairs to make up two berths, nine of the chairs will be used in forming six berths, and as a result one chair, 250, will be left over. In order to convert this extra chair into a berth, I provide a cushion structure 251 hinged in any suitable manner to the forward wall 252 of the vehicle, which may be lowered into position to form part of the berth, as indicated in broken lines. In this way the one chair with the additional cushions will form a complete berth. Should two chairs be left over, one chair, with half of the second, may be used to form a berth.

In Figs. 26 and 27 I have shown the arrangement of the washrooms 260 and 261 for the vehicle, together with a compartment 262 in which there is provided chairs of the Pullman type, with the exception that the arm rest 263 is of the type hereinbefore described and when the chairs are made up into berths, this arm rest can be positioned, as indicated in broken lines, with the arm rest 264 forming a flight of stairs for the entrance to the upper berth. It is preferable to use division curtains 243 in the compartment, as previously described, to provide separate dressing space for the occupants of the upper and lower berths. The entrance to the vehicle is through the doorway 265 and the entrance space 266 may be converted into a temporary washroom by means of curtains 267 and foldable basins 268.

Referring to Figs. 28 and 29 it will be noted that the doorway to the vehicle is indicated at 270 and the entrance hall at 271. In some installations it is desirable to provide two chairs in the hallway. These are indicated at 272 and 273, and they may be of either type hereinbefore described. As the hallway 271 is of necessity narrow, it is advantageous to have the seats positioned close against the entrance wall 274, during such time as the vehicle is taking on and discharging passengers.

When the seats are positioned against the wall 274 they cannot be inclined backwardly, as previously described, and, in order to permit this, it is preferable to provide track ways 275 of the type previously described and track-engaging elements formed on the chair, whereby during the time the vessel is in flight the chairs may be moved forwardly to such position as to allow such adjustability of the back of the chairs as the occupants may desire.

In the compartment 276 I provide a pair of chairs 277 which may be of the type illustrated in my preferred form of the invention, or the modified form, and as it will be remembered one pair of chairs is insufficient to form a complete berth, I have provided an upholstered shelf 278 extending around three sides of the chair at required height to match the cushions of the chairs when made into a berth, as is plainly indicated in Fig. 29. In other words the upholstered shelf portion 278 provides the necessary cushion area to complete one full berth. One advantage of this arrangement is that a berth of slightly greater length may be provided, which will be attractive to exceptionally tall passengers. Also a higher price may be charged therefor.

While I have shown and described the preferred embodiment of my invention, I do not wish to be limited to any of the details of construction shown herein, except as defined in the appended claims.

I claim:

1. In a vehicle cabin, the combination of a double row of chairs in spaced file relationship and spaced transversely in said file for seating comfort, means operatively associating said chairs to said cabin to enable relative transverse movement of said chairs while maintaining the same anchored in said cabin to position the chairs of a pair into contact with one another to the preliminary forming of a lower berth with a dressing margin at one side of the berth being formed, portions of said chairs being movable into lower berths, an upper berth for each lower berth, means for supporting the upper berths, vertical partitioning means adapted to transversely divide each dressing margin into a standing margin for a lower berth and a standing margin for an upper berth, said partitioning means including means for enclosing the upper berth and the lower berth with their respective lower and upper berth standing margins.

2. In a vehicle, the combination of a double row of chairs in spaced file relation and spaced apart transversely in said file to provide for seating comfort, anchoring means associated with said vehicle, said chairs comprising back and seat portions movable relative to one another, means interposed between said anchoring means and said chairs operable to enable said chairs to be moved together, the movable portions of said chairs forming berths including one set of alternate berths comprising four back portions and two seat portions, and another set comprising four seat portions and two back portions, and means for partitioning apart the berths so delineated.

3. In a vehicle cabin, the combination of a row of chairs in spaced file relation, means anchoring said chairs in said cabin at given spaces from one another within said cabin, said anchoring means including means enabling said chairs to be shiftable transversely in said spaces to form berth spaces and a dressing margin at one side of each berth space, said chairs including means convertible into berths, upper berths, means supporting the upper berths over the lower berths, vertically disposed partitioning means positioned within said dressing margins and extending transversely of said cabin to divide said dressing margins into upper and lower berth standing spaces, and means associated with said transversely dividing partitioning means for partitioning apart the lower berth from the upper berth standing space and for partitioning apart the upper berth from the lower berth standing space.

4. In a vehicle cabin, the combination of a double row of chairs in spaced file relationship, said row of chairs being spaced transversely in said file to provide for seating comfort, anchoring means associated with said cabin, arm rests for said chairs including an arm rest positioned between the adjacent chairs in each row, anchoring means for said arm rests, means interposed between said chairs and said first anchoring means operable to enable relative transverse movement of said chairs into edge to edge relation to form lower berth spaces and dressing margins at one side of said berth spaces, upper berths, means for supporting the upper berths over the lower berth spaces, vertical partitioning means adapted to transversely divide said dressing margins into upper and lower berth standing spaces, and said anchoring means for said chair arms including means for positioning said chair arms within the upper berth dressing spaces to form steps for access to said upper berths.

5. In a vehicle cabin, a double row of chairs in spaced file relationship on one side of an aisle, said chairs being spaced apart transversely of said file, means for supporting said chairs in said cabin to enable the aisle row of said chairs to be moved transversely to a position of substantial contact with the other row of said chairs to form a berth space and a dressing margin between said berth and the aisle, and partitioning means enclosing said berth and said dressing margin from said aisle.

6. In a vehicle cabin, an upper berth including a rectangular frame, means for hingedly supporting said frame from one side of said rectangular frame, said hinge means including drop hinges and diagonally extending brace cross ties at the ends of said rectangular frame extending between said frame and the cabin, and an end board hingedly secured to the rectangular frame at one end and having cooperating means connecting the same with said diagonal cross ties whereby the said end board is held in upright position when the upper berth is open.

7. In a vehicle cabin, the combination of a double row of chairs in spaced file relationship, said row of chairs being spaced transversely in said file to provide for seating comfort, anchoring means associated with said cabin, arm rests for said chairs including an arm rest positioned between the adjacent chairs in each row, anchoring means for said arm rests, means interposed between said chairs and said first anchoring means operable to enable relative transverse movement of said chairs into edge to edge relation to form lower berth spaces and dressing margins at one side of said berth spaces, upper berths, means for supporting the upper berths over the lower berth spaces, and said anchoring means for said chair arms including means for positioning said chair arms within the dressing margins to form steps for access to said upper berths.

TRIMBLE DE ROODE.